219-121
3/2/82

SR

OR 4,317,982

United States Patent [19]

Taudt et al.

[11] 4,317,982

[45] Mar. 2, 1982

[54] ORIFICE FOR COUPLING AN ELECTRON BEAM GUN TO PRINT FORM CYLINDERS

[75] Inventors: Heinz Taudt; Dieter Grieger, both of Kiel; Siegfried Beisswenger, Preetz, all of Fed. Rep. of Germany

[73] Assignee: Dr. Ing. Rudolf Hell GmbH, Fed. Rep. of Germany

[21] Appl. No.: 35,688

[22] Filed: May 3, 1979

[30] Foreign Application Priority Data

May 8, 1978 [DE] Fed. Rep. of Germany ....... 2819993
Aug. 5, 1978 [DE] Fed. Rep. of Germany ....... 2834457

[51] Int. Cl.³ ............................................. B23K 15/00
[52] U.S. Cl. ....................... 219/121 EN; 219/121 EB
[58] Field of Search ................. 219/121 EB, 121 EM, 219/121 EJ, 121 EK, 121 EL, 121 EN, 121 EQ; 277/DIG. 7, 151

[56] References Cited

U.S. PATENT DOCUMENTS 3,136,882 6/1964 Radtke ........................ 219/121 EM
3,402,278 9/1968 Dernbach ......................... 219/69 R
3,428,776 2/1969 Stauffer .................... 219/121 EQ X
3,549,854 12/1970 Sciaky ......................... 219/121 EM
3,719,791 3/1973 Peyrot .......................... 219/121 EN
3,816,699 6/1974 Wellendorf et al. ......... 219/121 EB
4,045,647 8/1977 Thome ......................... 219/121 EN
4,103,912 8/1978 Thome ..................... 219/121 EB X

FOREIGN PATENT DOCUMENTS 1481471 7/1977 United Kingdom ......... 219/121 EB

*Primary Examiner*—C. L. Albritton
*Attorney, Agent, or Firm*—Hill, Van Santen, Steadman, Chiara & Simpson

[57] ABSTRACT

An orifice for coupling a highly-evacuated electron beam gun to a rotating print form cylinder for engraving is provided such that the gun has a rigid cover with an opening for the electron beam at its end facing the print form cylinder and a flexible band is arranged at the cover which partially surrounds the print form cylinder. The band is pivoted at the cover and at least one of the pivot points is elastically designed and pivoting occurs with the aid of springs which are adjustable with respect to the spring force.

23 Claims, 2 Drawing Figures

ORIFICE FOR COUPLING AN ELECTRON BEAM GUN TO PRINT FORM CYLINDERS

BACKGROUND OF THE INVENTION

1. Field of the Invention

The present invention relates to printing techniques and is particularly concerned with an orifice structure for coupling a highly-evacuated electron beam gun to a rotating print form cylinder for engraving.

2. Description of the Prior Art

The object of operating print form cylinders with the aid of an electron beam gun can be resolved in that the print form cylinder itself is supported in an evacuated chamber. Operating installations of this type of arrangement are known, for example, from U.S. Pat. No. 3,402,278; however, such installations have the disadvantage of extensive preparation and evacuation times, in particular in the presently-common great dimensions of photogravure form cylinders.

Additionally, structures are known which convey the orifice of the electron beam gun at a certain distance from the cylinder space. For thus purpose, the exterior pressure is decreased in steps to the necessary operating vacuum by means of concentric arrangements of several pressure stages.

French Pat. No. 1,480,912, German published application No. 2,207,090 and the German allowed application No. 1,515,201 all disclose systems of this type.

These structures have the decisive disadvantage that the gap between the orifice and the cylinder surface must be rather large, because the print form cylinders have relatively great concentricity errors in practical installations. Thereby, the leakage rate becomes so great that an enormous expense in regard to evacuating systems must be carried out in order to maintain the operating vacuum in the effective operational point of the electron beam. Moreover, the great leakage rate requires large suction cross sections. The frontal openings of such arrangements are therefore so large that they do not permit engraving a print form cylinder substantially to the edge, as is required in the printing technique.

Even solutions which provide a sealing foil directly over the cylinder surface, which foil or layer is permeable for the electron beam (U.S. Pat. No. 3,816,699) are not sufficient in practice, because the considerable material removal would cover the frontal surface of the foil much too rapidly, and would therefore render it impermeable for the electron beam.

Slip seals, as described in the German Gebrauchsmuster No. 75 05 278 also cannot achieve the requirements in practice. If one keeps the opening in these embodiments small (engraving to the cylinder edge), the relatively great overall height in the direction of the gun axis limits the trajectory of the removed particles such that the opening is rapidly overgrown by the removal. If one provides a large opening, it may be possible to keep the trajectory path open; however, the cylinder again can only be engraved up to an edge spacing which is somewhat larger than the opening radius. Furthermore, the structures disclosed above will have the disadvantage that the force play between vacuum and exterior pressure is hard to control. The gun is fundamentally drawn against the cylinder with the full suction force of the vacuum which, at least with sliding washers of great large opening cross sections, surely leads to difficulties at the slide point due to the high specific contact pressure. There, also, the dynamic leakage rate is very great.

In order to consider the leakage rate in sliding seals, several operating conditions must be differentiated. If the orifice operates on an unengraved cylinder surface, the leakage rate is to be low. However, this static leakage rate need not lie extremely below the dynamic leakage rate formed in that the orifice operates by half on an already engraved surface. The engraved printing elements, normally cup-shaped depressions in the cylinder surface, separated from one another, thereby continuously proceed, filled with air from the exterior pressure, beneath the orifice and are evacuated there into the vacuum of the electron gun. One can readily appreciate that not only the static, but also the dynamic, leakage rate depends to a great extent on the dimensions of the orifice opening which cannot be arbitrarily decreased in the structure suggested in the German Gebrauchsmuster No. 75 05 278, for the above-mentioned reasons.

All of the solutions described above have the disadvantage that they can only be adjusted to the many different cylinder circumferences which are conventional in practice with great difficulty. This must proceed within one operation, perhaps several times in a day.

SUMMARY OF THE INVENTION

It is therefore the object of the present invention to avoid all of the disadvantages mentioned above and to provide a practical coupling element between an electron beam gun and a print form cylinder for the production of print form apparatus.

According to the present invention, the above object is achieved in that the electron gun is provided with a rigid cover which has an opening for the electron beam at an end facing the print form cylinder, and that a band is arranged on the cover, which band partially surrounds the print form cylinder.

An advantageous further development of the invention can be seen in a structure of the type just mentioned in which the band has a sliding member at the side facing the cylinder, which sliding member comprises a carbon or graphite layer, whereby the sliding member can be designed as a self-adhesive layer in order to readily exchange this part which is subject to wear.

The arrangement of an elastic form piece, vulcanized or glued to the side of the band which faces away from the print form cylinder, which lies against the frontal surface of the gun cover with a sealing lip when the gun is in the operating position, is of additional advantage. Bore holes and/or channels in the cover of the gun can thereby support the sealing structure of the lip in that the suction force of the vacuum is effective through such bores or channels.

Of additional advantage is the provision of pivotal points of the band at the cover so they can be displaced and fixed, and to pivot the band by way of springs at one or both ends, which springs can be adjusted with respect to their spring force.

With the arrangement mentioned, a balance is obtained between the vacuum suction force, on the one hand, and by means of prestressing of the band, on the other hand, such that only a prescribed differential force becomes effective as a bearing force at the sliding surface. With a suitable dimensioning of the components, one can further obtain a spring bearing of the frictional surface at the point of operation which is sufficiently elastic that the frictional force has only a very small change-over component when deviating from the ideal cylinder form. The specific surface stress, and thus friction and wear in the friction surface, are held within limits. By the adjustability of the pivot points and the ability for setting the spring force, one can advantageously provide that the orifice can readily be adjusted to different cylinder circumferences and the operation always takes place under the same operating conditions. The surface stress of the friction surface, in particular, can be held almost constant for different cylinder circumferences and one can simultaneously take care that the friction layer abuts the cylinder with its total surface. Therefore, no tangential wedge gaps result by means of which interfering particles may be interposed between the friction surface and the cylinder surface.

Another advantage is the provision of engraving closely to the ends of the cylinder, as required in the printing technique, by means of the relatively narrow band in the direction of the cylinder axis. By means of a suitable form of the components, it is also obtained that the trajectory angle of the removed material accumulating in the form of vapor or droplets can be held extremely flat. No surfaces are in the flight path at which the removed particles can accumulate such that the opening for the electron beam is overgrown during operation.

Practice has shown that the printing elements filled with air at atmospheric pressure, which were engraved into the print form surface in a narrow helix in a regular arrangement with the aid of the electron beam, which print elements have print motif-depedent volumes, convey different amounts of air to the vicinity of the effective point of the electron beam. Thereby, the vacuum conditions are there subject to motif-depedent fluctuations which unfavorably influence the operating process.

An advantageous further development of the orifice arrangement can therefore be seen in that at least one additional opening is present in the area of the sliding surface, in addition to the opening for the electron beam, which additional opening is arranged relative to the opening for the electron beam such that the already engraved cups covering the opening for the electron beam by half, must first pass the additional opening in the slide facing. An elastically designed conduit is connected to this opening in the interior of the electron beam gun which is conveyed, vacuum-tight, through the wall of the electron beam gun and which leads to a vacuum pump. With this structure it is obtained that the already engraved cups are first evacuated, which cups have print motif-dependent volume, and would normally reach, filled with gas by the exterior pressure, the opening for the electron beam. The amount of gas conveyed would otherwise cause fluctuations in the vacuum conditions in the vicinity of the effective point of the electron beam, depending upon the motif, which would unfavorably influence the operating process. A pre-evacuation of the cups reduces the amount of gas fed by the cups into the interior of the gun by 1%°, the pre-evacuation being possible without difficulty, for example, to 1 mb from atmospheric pressure (corresponding with 1000 mb) by means of the arrangement described. The fluctuation of the vacuum conditions at the effective point of the electron beam is thereby reduced to such an extent that it no longer influences, in an interfering manner, the operating process.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
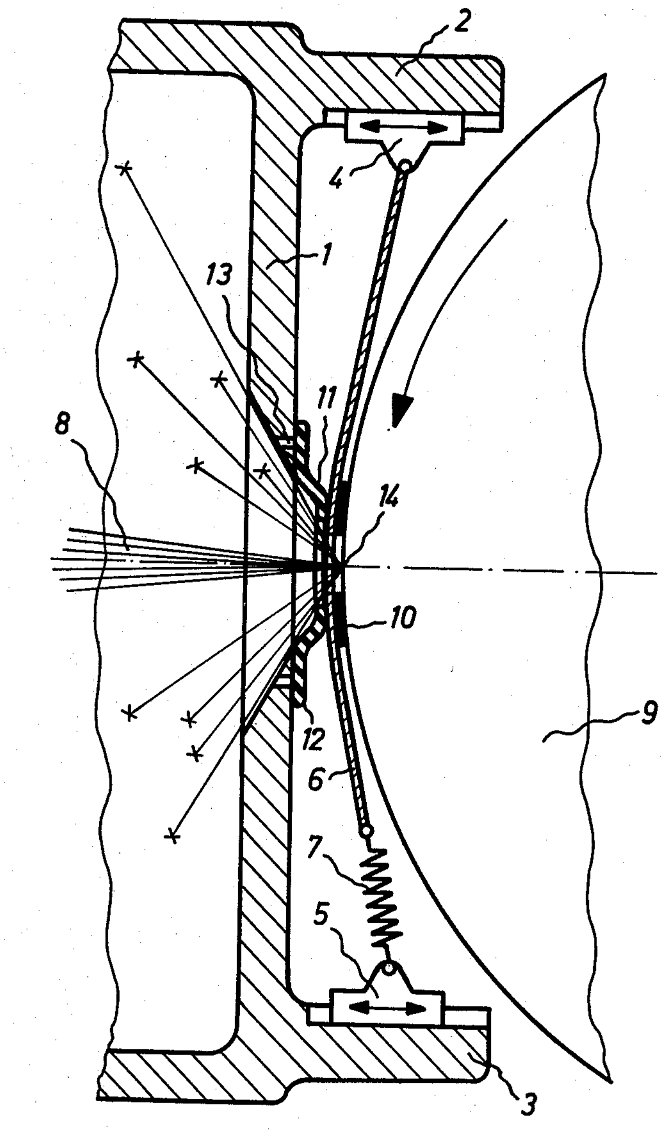
FIG. 1 is a fragmentary sectional view which illustrates an arrangement of an orifice and a print form cylinder constructued in accordance with the present invention.

Referring to FIG. 1, a front end of an electron beam gun has a rigid cover 1 which carries, on the front side thereof, two supports 2 and 3. A pair of pivotal members 4 and 5 are carried, respectively, by the supports 2 and 3 and have a flat band 6 and a spring 7 respectively connected thereto such that an adjustment can be carried out in the axial direction of the gun and can be subsequently fixed, as indicated by the double-headed arrows. The band 6 produced, for example, of thin steel plate is perforate at an opening point 14 to receive an electron beam 8 therethrough and frictionally bears on a friction element 10, on the side facing a print form cylinder 9, the element 10 also being perforate and consisting, for example, of a self-adhesive graphite layer. A form piece 11 comprising an elastic material, for example rubber, is secured to the band 6, such as by vulcanization or gluing, and bears against the front side of the cover 1 with a sealing lip 12 when the gun is in the operating position. Bore holes and/or channels 13 in the cover 1 are provided through which the suction force of the vacuum of the gun causes a gripping action of the form piece 11 to the cover 1 at the lip 12. The form piece 11 is drawn in the axial direction of the electron gun in a greatly exaggerated form for the sake of clarity. In practice, the form piece 11 will be much flatter. Thereby, the opening 14 for the electron beam 8 is much closer to the cover 1 than illustrated, whereby the actual trajectory angle of the removed material is much flatter than that illustrated on the drawings by the x's.

Figure 2:
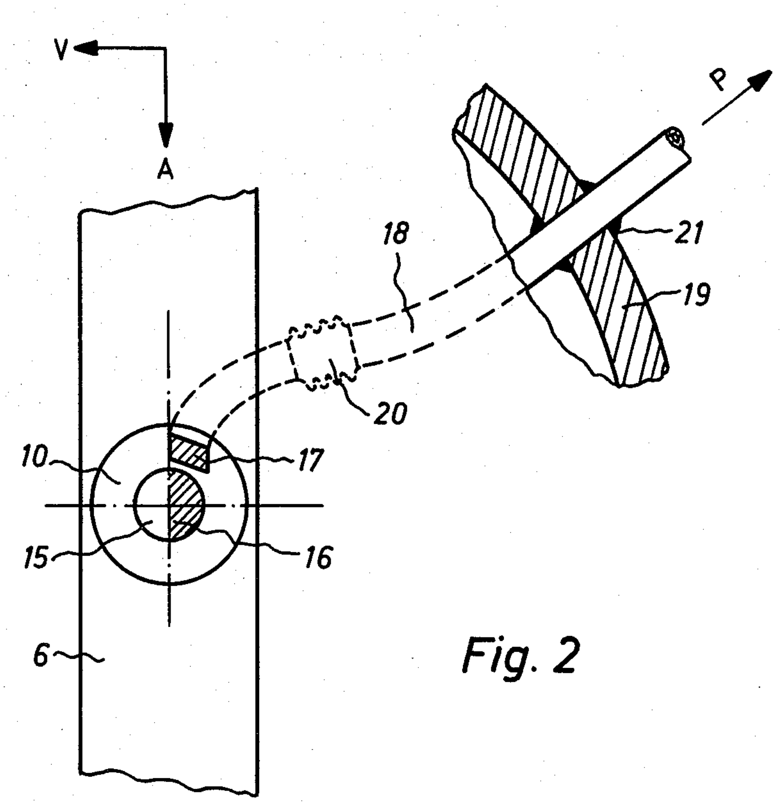
FIG. 2 illustrates the orifice with a pre-exhaust as viewed from the direction of the print cylinder.

FIG. 2 schematically illustrates an embodiment of the orifice having a pre-exhaust provided, as viewed from the print cylinder looking toward the electron beam gun.

The opening 15 for the electron beam is covered in the shaded area 16 by already-engraved cups having motif-dependent volume, where A represents the peripheral motion of the print cylinder and V respresents the advance direction of the electron beam gun. An opening 17 for pre-evacuation of the cups lies in an area of the friction element 10 which, according to the present invention, abuts the cylinder 9 in a manner so as to seal the surface thereof. Because the band 6 elastically holds the total orifice arrangement according to the present invention, a vacuum line 18, connected to the opening 17, must also be elastic. This is effective by an elastic tube element 20 which, for example, can be a rubber hose or a metal spring bellows. The vacuum line 18 is sealed vacuum-tight through a wall 19 of the electron beam gun at a point 21 and leads to a vacuum pump as indicated by the reference P.

Although we have described our invention by reference to a particular illustrated embodiment thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In combination, a print form roller, a highly-evacuated electron beam gun and an orifice structure for coupling said highly-evacuated electron beam gun to said print form roller for engraving said roller, said orifice structure comprising:

an end cover on said electron beam gun including a beam passing opening for receiving the electron beam therethrough and a forwardly-extending cover extension; and flexible band means carried by said cover extension, and slidingly engaging said roller, said band means including an opening aligned with said opening of said end cover.

2. The orifice structure of claim 1, wherein: said band means comprises elastic material.

3. In combination, a print form roller, a highly-evacuated electron beam gun and an orifice structure coupling said highly-evacuated electron beam gun to said printed form roller for engraving said roller, said orifice structure comprising:

an end cover on said electron beam gun including a beam passing opening for receiving the electron beam therethrough and a forwardly-extending cover extension;

flexible band means carried by said cover extension, and slidingly engaging said roller, said band means including elastic material and an opening aligned with said opening of said cover; and pivotal mounting means at each end of said band means pivotally mounting said band means to said cover.

4. In combination, a print form roller, a highly-evacuated electron beam gun and an orifice structure coupling said highly-evacuated electron beam gun to the print form roller for engraving said roller, said orifice structure comprising:

an end cover on said electron beam gun including a beam passing opening for receiving the electron beam therethrough and a forwardly-extending cover extension;

flexible band means carried by said cover extension, and slidingly engaging said roller, said band means comprising elastic material and including an opening aligned with said opening of said end cover;

pivotal mounting means at each end of said band means pivotally mounting said band means to said cover; and spring means connecting at least one end of said band means to the respective pivotal means.

5. The orifice structure of claim 4, wherein at least one of said pivotal means is movably mounted for forward/backward adjustment on said cover.

6. The orifice structure of claim 5, comprising:

anti-friction slide means between said band and the roller and slidingly engaging on the roller.

7. The orifice structure of claim 6, wherein:

said anti-friction slide means comprises a graphite layer.

8. The orifice structure of claim 6, wherein:

said anti-friction slide means comprises a carbon layer.

9. The orifice structure of claim 6, wherein:

said anti-friction slide means comprises a self-adhesive layer.

10. The orifice structure of claim 5, comprising:

an elastic cup-shaped element disposed between said band and said end cover.

11. The orifice structure of claim 10, wherein:

said cup-shaped element comprises a peripheral lip for engaging the forward surface of said cover.

12. The orifice structure of claim 11, comprising:

additional openings in said cover, in the area the lip is engaging the cover, said openings being connected with the vacuum inside the electron beam gun and effecting an increased sealing of the lip by an additional suction force.

13. The orifice structure of claim 12, wherein:

said openings are boreholes.

14. The orifice structure of claim 12, wherein:

said openings are leading to a ring shaped channel in the area, where the lip engages the cover.

15. An orifice structure for coupling a highly evacuated electron beam gun to a print form roller for engraving the roller, comprising:

an end cover of the electron beam gun having a first opening for receiving an electron beam therethrough;

a pair of pivotal mounts carried by said cover, said mounts being axially adjustable in the direction of the electron beam, a flexible band pivotally attached at its ends to respective ones of said pivotal mounts and including a second opening aligned with said first opening;

a sealing element carried by said band covering the area of said first opening, having a third opening aligned with said first opening, and urged against said end cover by said band, and anti-friction slide means carried by said band on the side thereof opposite said sealing element to engage the roller.

16. The orifice structure of claim 15, wherein:

said anti-friction slide means includes a fourth opening aligned with said first opening.

17. The orifice structure of claim 16, wherein:

said anti-friction slide means comprises a graphite layer.

18. The orifice structure of claim 16, wherein:

said anti-friction slide means comprises a carbon layer.

19. The orifice structure of claim 16, wherein:

said anti-friction slide means comprises a self-adhesive layer.

20. In combination, a print form roller, a highly-evacuated electron beam gun and an orifice structure coupling said highly-evacuated electron beam gun to said print form roller for engraving said roller, said orifice structure comprising:

an end cover on said electron beam gun including a beam passing opening for receiving the electron beam therethrough and a forwardly-extending cover extension;

flexible band means carried by said cover extension, and slidingly engaging said roller, said band means including a first opening aligned with said opening of said end cover and a second opening in the area where said band means engages said roller, said second opening positioned such that engraved areas of said roller pass said second opening prior to reaching said beam passing first opening of said band means; and a vacuum source connected to said second opening.

21. The orifice structure of claim 20, wherein:

said vacuum source is a separate vacuum pump.

22. The orifice structure of claim 20, wherein:

said vacuum source is one of the pre-vacuum pumps of the arrangement.

23. The orifice structure of claim 20, comprising:

an elastic conduit arranged in the interior of the electron beam gun said conduit connecting said additional opening and the vacuum source.

* * * * *